US007826419B2

(12) United States Patent
Wang et al.

(10) Patent No.: US 7,826,419 B2
(45) Date of Patent: Nov. 2, 2010

(54) METHOD AND SYSTEM TO IMPROVE TRANSMISSION AND RECEIPT OF CHANNEL DESCRIPTORS

(75) Inventors: Huai Y. Wang, Coconut Creek, FL (US); Floyd D. Simpson, Lake Worth, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 812 days.

(21) Appl. No.: 11/412,615

(22) Filed: Apr. 27, 2006

(65) Prior Publication Data

US 2007/0253362 A1 Nov. 1, 2007

(51) Int. Cl.
*H04W 4/00* (2009.01)
(52) U.S. Cl. ............... 370/329; 370/341; 455/450; 455/458; 455/509; 455/515
(58) Field of Classification Search ............... 455/343.2, 455/343.3, 343.4, 434, 435.1, 450, 466, 502, 455/503, 515, 516, 517, 69, 458, 464, 509, 455/522, 574; 370/311, 318, 477, 320, 322, 370/324, 329, 335, 338, 341, 342, 348–350, 370/431, 441, 443, 445, 503, 509; 340/7.32–7.38
See application file for complete search history.

(56) References Cited

U.S. PATENT DOCUMENTS

| 6,721,294 B1 * | 4/2004 | Bahrenburg et al. ........ 370/335 |
| 2005/0025092 A1 * | 2/2005 | Morioka et al. ............. 370/328 |
| 2005/0128988 A1 * | 6/2005 | Simpson et al. ............. 370/338 |
| 2005/0159163 A1 | 7/2005 | Chang et al. |
| 2006/0029011 A1 | 2/2006 | Etemad et al. |
| 2006/0194598 A1 * | 8/2006 | Kim et al. ................... 455/509 |
| 2006/0227778 A1 * | 10/2006 | Jin et al. ..................... 370/389 |
| 2007/0026863 A1 * | 2/2007 | Wilson et al. ............... 455/437 |
| 2007/0270118 A1 * | 11/2007 | Subramanian et al. ... 455/343.2 |
| 2008/0101275 A1 * | 5/2008 | Kang et al. .................. 370/315 |

OTHER PUBLICATIONS

U.S. Appl. No. 11/318,322, filed Dec. 23, 2005, Smith et al.
Downlink Burst Profile Synchronization for MSS in Sleep Mode—IEEE 802.16 Broadband Wireless Access Working Group http://ieee802.org/16—Samsung Electronics—Jungje Son et al.—Nov. 14, 2004.
Definition of valid DL-MAP/DCD in MAC synchronization—IEEE 802.16 Broadband Wireless Access Working Group http://ieee802.org/16—Donald Stevenson et al.—Mar. 14, 2005.
PCT International Search Report Dated Sep. 8, 2008 for Application No. PCT/US07/065411—8 pages.

* cited by examiner

*Primary Examiner*—Anthony S. Addy
(74) *Attorney, Agent, or Firm*—Sylvia Chen; Larry G. Brown

(57) ABSTRACT

The invention concerns a method (200) and system for improving transmission or receipt of channel descriptors. The method can include the steps of—in a wireless communication system (100) that periodically broadcasts regular channel descriptors (310) at a set interval (312)—changing (212) a modulation scheme and transmitting (216) one or more supplementary channel descriptors (314) during the set interval between regular channel descriptors. The method can also include the step of periodically transmitting (214) a channel descriptor count (412) that provides an indication of the changed modulation scheme.

18 Claims, 2 Drawing Sheets

METHOD AND SYSTEM TO IMPROVE TRANSMISSION AND RECEIPT OF CHANNEL DESCRIPTORS

BACKGROUND OF THE INVENTION

1. Field of the Invention

The present invention concerns the management of channel descriptors and more particularly, the management of such descriptors to improve the efficiency of mobile stations.

2. Description of the Related Art

The Institute of Electrical and Electronics Engineers (IEEE) 802.16e standard calls for the periodic transmission of channel descriptors, such as downlink channel descriptors (DCD) and uplink channel descriptors (UCD), to mobile subscriber stations (MSS). The DCD and the UCD contain information that relates to, among other things, the modulation schemes employed by the base station (BS) in communication with the MSS. In accordance with the 802.16e standard, the intervals between DCD and UCD transmissions may be relatively long, up to ten seconds, in fact.

There may be times, however, when the BS changes its modulation schemes. As an example, the MSS may monitor a DCD or UCD counter to determine when the BS has changed these schemes. If the MSS detects the modification through the DCD or UCD counter, the MSS may determine when the next DCD containing the new modulation information will arrive by processing a broadcast control pointer information element (IE). Given the long intervals between DCDs or UCDs mentioned above, this time may be nearly ten seconds. During this time, the MSS may not be able to decode any information that it receives from the BS or to transmit to the BS using a modulation that is acceptable to the BS, which severely affects the performance of the MSS.

SUMMARY OF THE INVENTION

The present invention concerns a method for improving transmission or receipt of channel descriptors. The method can include the steps of—in a wireless communication system that periodically broadcasts regular channel descriptors at a set interval—changing a modulation scheme and in response, transmitting one or more supplementary channel descriptors during the set interval between regular channel descriptors. The method can also include the step of periodically transmitting a channel descriptor count that provides an indication of the changed modulation scheme. As an example, the channel descriptor count can be in a downlink map or an uplink map.

The method can further include the step of periodically transmitting a pointer that can identify the arrival of one or more of the supplementary channel descriptors. For example, the pointer may be a broadcast control pointer as set forth in the 802.16e standard. As another example, the supplementary channel descriptors may contain less information than what is contained in the regular channel descriptors. The data in the supplementary channel descriptors may contain information relating to the changed modulation scheme. As another example, the regular and supplementary channel descriptors can be downlink channel descriptors or uplink channel descriptors.

The present invention also concerns another method for improving transmission or receipt of channel descriptors. The method can include the steps of—in a mobile station that periodically receives regular channel descriptors transmitted at a set interval—detecting a change in a modulation scheme of a base station and receiving one or more supplementary channel descriptors during the set interval between regular channel descriptors. The change in the modulation scheme can be detected through a channel descriptor count. In addition, a pointer can be used to determine the arrival of one or more of the supplementary channel descriptors.

The present invention also concerns a base station that improves the transmission of channel descriptors. The base station can include a transmitter that can periodically broadcast regular channel descriptors at a set interval and a processor communicatively coupled to the transmitter. The processor may be programmed to change a modulation scheme, and in response, the transmitter may transmit one or more supplementary channel descriptors during the set interval between regular channel descriptors. In one arrangement, the transmitter may periodically transmit a channel descriptor count that can provide an indication of the changed modulation scheme. The transmitter may also periodically transmit a pointer that can identify the arrival of one or more of the supplementary channel descriptors.

The invention also concerns a mobile station. The mobile station can include a receiver that can periodically receive from a base station regular channel descriptors transmitted at a set interval and a processor that is communicatively coupled to the receiver. The processor can be programmed to detect a change in a modulation scheme of a base station, and in response, the receiver may receive one or more supplementary channel descriptors during the set interval between regular channel descriptors. As an example, the processor may be further programmed to detect the change in the modulation scheme through a channel descriptor count. As another example, the processor is also programmed to use a pointer to determine the arrival of one or more of the supplementary channel descriptors.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE INVENTION

Figure 1:
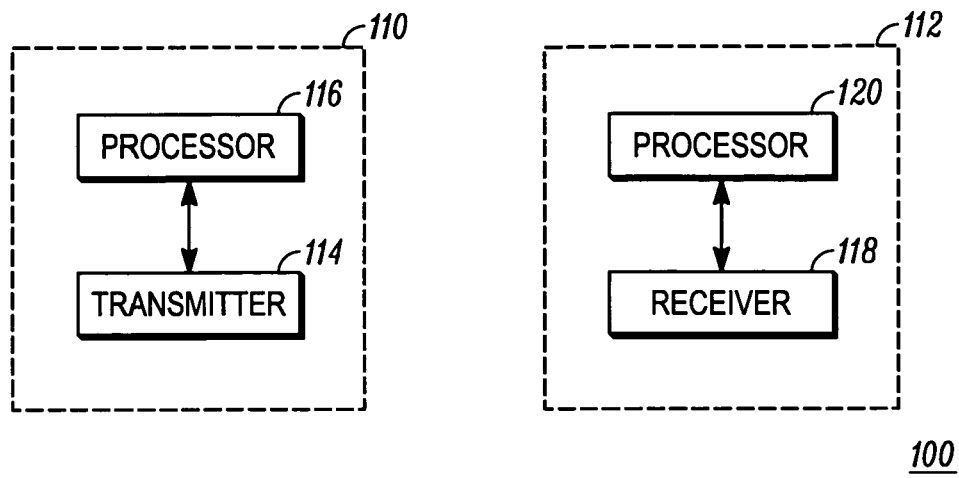
FIG. 1 illustrates a system for improving the transmission and receipt of channel descriptors in accordance with an embodiment of the inventive arrangements.

While the specification concludes with claims defining the features of the invention that are regarded as novel, it is believed that the invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled" as used herein, are defined as connected, although not necessarily directly, and not necessarily mechanically. The term "processor" can include any component or group of components, including any relevant hardware and/or software, that can carry out the functions described in relation to the inventive arrangements herein.

The present invention concerns a method and system for improving transmission or receipt of channel descriptors. The method can include the steps of—in a wireless communication system that periodically broadcasts regular channel descriptors at a set interval—changing a modulation scheme and in response, transmitting one or more supplementary channel descriptors during the set interval between regular channel descriptors. The method can also include the step of periodically transmitting a channel descriptor count that provides an indication of the changed modulation scheme. As such, once an MSS becomes aware of a change in the modulation scheme, the MSS can quickly obtain relevant information about the change, thereby avoiding a potentially long wait during a channel descriptor interval.

Referring to FIG. 1, a wireless communication system 100 for improving transmission or receipt of channel descriptors is shown. In one arrangement, the system 100 can include one or more BS 110 and one or more MSS 112, which are communicatively coupled (for simplicity, BS and MSS may refer to both units in the singular or plural). As an example, the BS 110 can be implemented in a wide area network (WAN), although the invention is not so limited, as the BS 110 can be part of any other suitable communications network. In fact, the term base station can refer to a component that is or components that are capable of exchanging wireless signals with any suitable number of mobile communications devices. As shown in FIG. 1, the BS 110 can include a transmitter 114 and a processor 116, which can execute several functions, some of which will be described below. The processor 116 can be communicatively coupled to the transmitter 114.

The MSS 112 can be any suitable device that is capable of exchanging wireless signals with the BS 110. The MSS 112 can perform any suitable number of functions, such as making interconnect, dispatch or VoIP calls, multimedia applications and e-mail, although the invention is not limited to this particular listing. In this example, the MSS 112 can include a receiver 118 and a processor 120, which can be communicatively coupled to the receiver 118. As will be described below, the processor 118 can take certain actions to improve the receipt of channel descriptors. In one particular arrangement, the BS 110 and the MSS 112 may operate in an 802.16e system, although the invention is not limited to this particular example.

Figure 2:
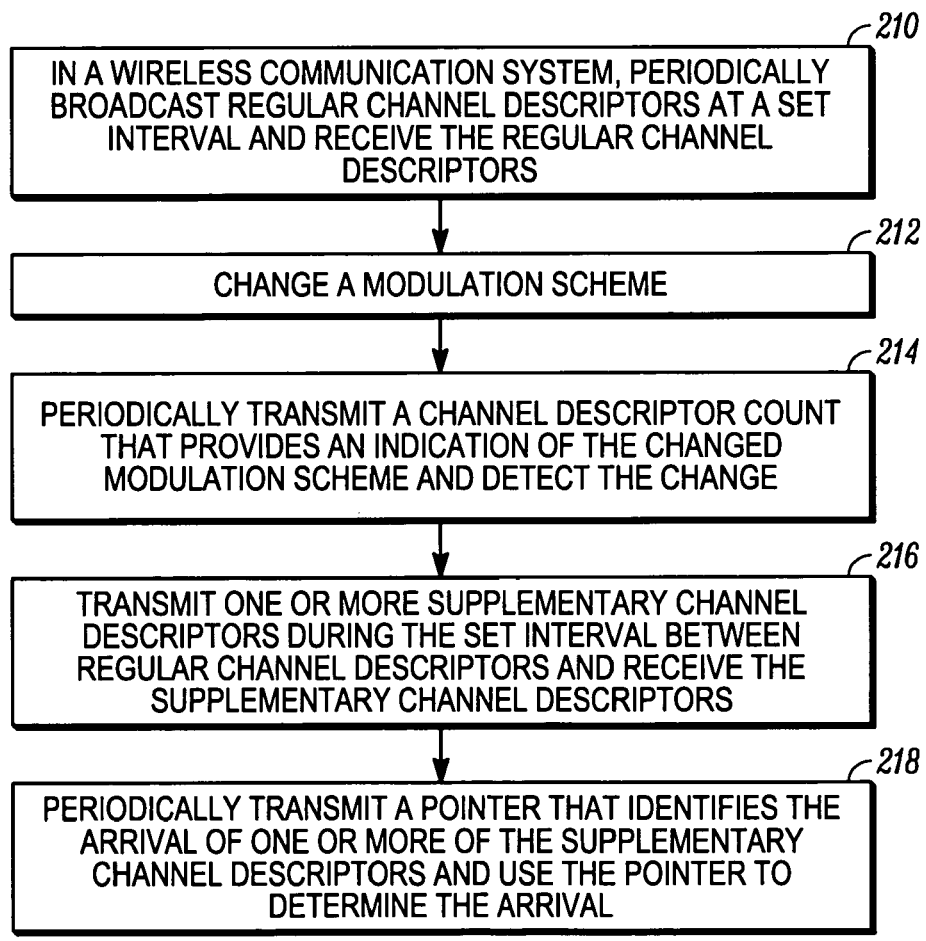
FIG. 2 illustrates a method for improving the transmission and receipt of channel descriptors in accordance with an embodiment of the inventive arrangements.
Figure 3:
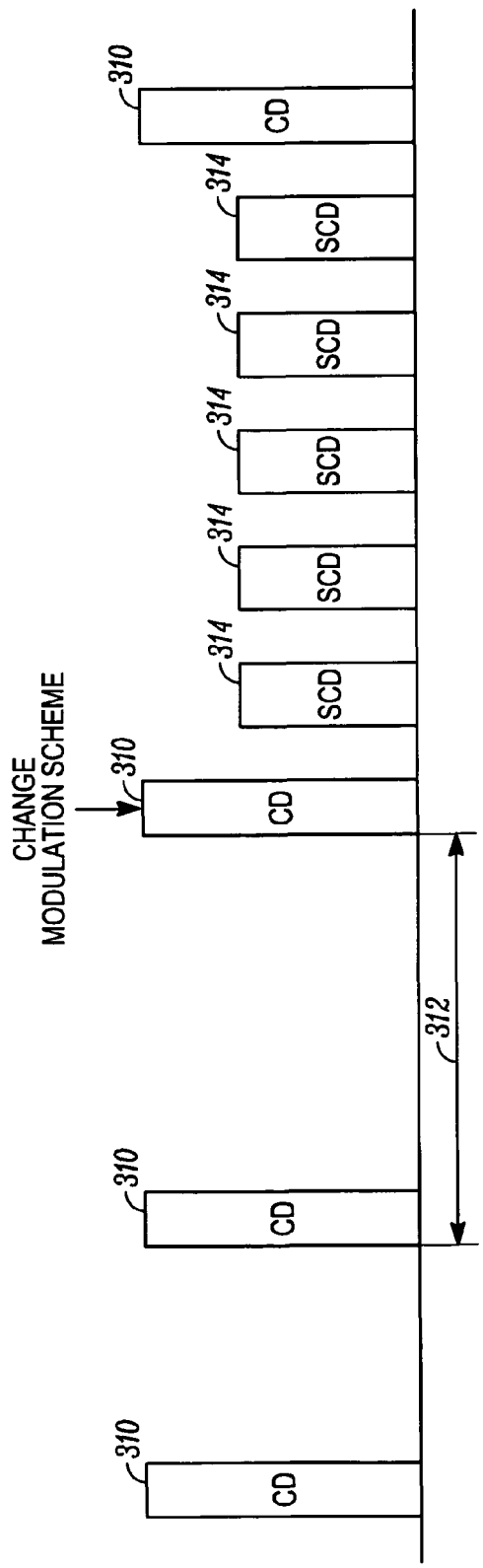
FIG. 3 illustrates an example of the transmission and receipt of channel descriptors in accordance with an embodiment of the inventive arrangements.
Figure 4:
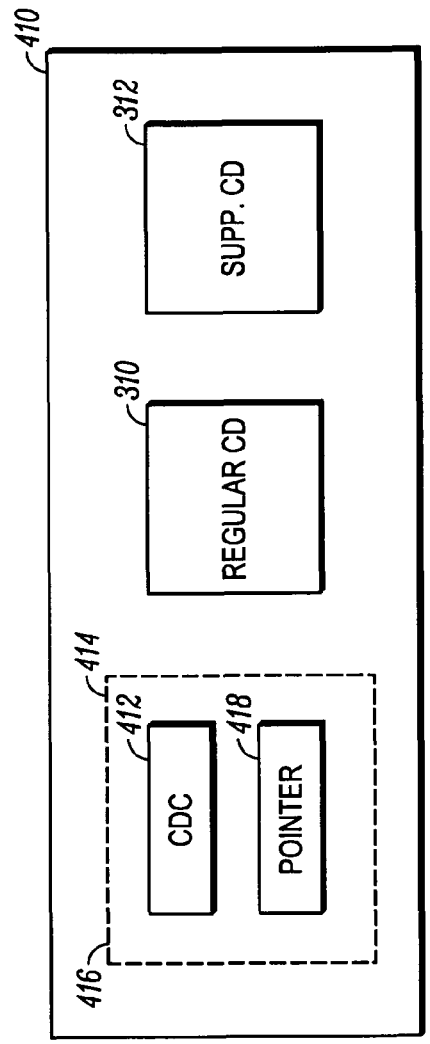
FIG. 4 illustrates an example of a frame in accordance with an embodiment of the inventive arrangements.

Referring to FIG. 2, a method 200 for improving the efficiency of the transmission and receipt of channel descriptors is shown. When describing the method 200, reference will be made to FIG. 1, although it is understood that the method 200 can be practiced in any other suitable system or device. Reference may also be made to FIGS. 3 and 4, which respectively show an example of several channel descriptor intervals and an example of a frame, although the invention is in no way limited to these particular examples. Moreover, the steps of the method 200 are not limited to the particular order in which they are presented in FIG. 2. The inventive method can also have a greater number of steps or a fewer number of steps than those shown in FIG. 2.

At step 210, in a wireless communication system, regular channel descriptors can be periodically broadcast at a set interval, and these regular channel descriptors can be received. At step 212, a modulation scheme can be changed. A channel descriptor count that can provide an indication of the modulation change can be periodically transmitted, and the change can be detected, as shown at step 214.

For example, referring to FIGS. 1 and 3, the BS 110 of the system 100 can periodically broadcast regular channel descriptors (CD) 310 at a set interval, and the MSS 112 can receive one or more of the regular CDs 310. As an example, the regular CD 310 may be a downlink channel descriptor (DCD) or an uplink channel descriptor (UCD), both of which are described in the 802.16e standard. As is known in the art, the CD 310 may contain information relating to the modulation schemes employed by the BS 110 or the modulation schemes that the MSS 112 should use. As such, the term channel descriptor can mean any block of data that includes information relating to modulation schemes. In addition, a modulation scheme can be any suitable protocol that provides guidance on how information may be encoded, modulated and/or exchanged between a transmitter/receiver pair.

The MSS 112 may use the information in the CDs 310 to determine how to decode transmissions from the BS 110 and how to encode transmissions to the BS 110. As is also known in the art, the CDs 310 may be transmitted at a set interval, and the double arrow may represent the amount of time between the transmission of CDs 310, or a CD interval 312. As was previously noted, the CD interval 312 may be relatively long in duration.

Referring to FIG. 4, an example of a portion of a frame 410 is shown. The frame 410 may be used to carry information between the BS 110 and the MSS 112 and can be, for example, an orthogonal frequency division multiple access (OFDMA) frame. In this example, the frame 410 can include a channel descriptor count (CDC) 412, which, as is known in the art, can provide an indication of a changed modulation scheme. That is, the BS 110 may modify its modulation schemes and those to be used by the MSS 112, and in response, the BS 110 can modify the count of the CDC 412. The MSS 112 can detect the change in the modulation scheme through the CDC 412. In one arrangement and without limitation, the CDC 412 may be an uplink CDC or a downlink CDC, which may be respectively contained within an uplink map 414 or a downlink map 416 of the frame 410 The dashed box represents both an uplink map 414 or a downlink map 416, although they may be separate portions of data.

Referring back to FIG. 2, at step 216, one or more supplementary channel descriptors may be transmitted during the set interval between regular channel descriptors, and the supplementary channel descriptors can be received. At step 218, a pointer can be periodically transmitted, and this pointer can be used to identify the arrival of one or more of the supplementary channel descriptors.

Referring now to FIG. 4, the frame 410 can also include a pointer 418, which, as an example, can be a broadcast control pointer, as described in the 802.16e standard. The pointer 418 may also be part of the uplink map 414 or the downlink map 416. Referring now to FIGS. 1, 3 and 4, the BS 110, as noted above, may change the modulation schemes employed by it and the MSS 112. The information related to this change can be contained in the CD 310 with the arrow pointing to it. As is known in the art, the MSS 112 may continuously enter into a sleep mode to conserve energy. As such, the MSS 112 may wake up after the CD 310 containing the new modulation information is transmitted from the BS 110. Because of the long interval 312 between CDs 310, the MSS 112 may have to wait an unacceptable amount of time before being able to receive the next CD 310 containing the new modulation information.

To overcome this problem, the BS 110 may transmit one or more supplementary CDs 314 during the set interval, such as the CD interval 312, between regular CDs 310. As an example, the supplementary CDs 314 may contain less information than what is provided in the regular CDs 310. In particular, the supplementary CDs 314 may only contain information concerning the new modulation scheme or the differences between the old and new modulation schemes. While this process may save bandwidth, it is understood that the invention is not limited as such, because the supplementary CDs 314 may be similar to the regular CDs 310. Because the invention applies to both uplink and downlink, the supplementary CDs 314 may be either uplink or downlink supplementary CDs 314. Also, the regular CDs 310 and the supplementary CDs 314 may be part of the frame 410, although a channel descriptor may not be a part of every frame 410 that reaches the MSS 112.

In one arrangement, the CDC 412 and the pointer 418 may be frequently transmitted, such as in every frame 410. The frame 410 may be, as an example, five milliseconds (ms) in length. As such, when the MSS 112 wakes up from sleep mode, the MSS 112 may quickly receive the CDC 412 and the pointer 418. Thus, if the BS 110 has changed the modulation schemes, the MSS 112, when it wakes up, can determine this change from the value of the CDC 412. In one arrangement, the MSS 112 can access the pointer 418 to determine when the next channel descriptor is available in the CD interval 312. More than likely, the next available channel descriptor will be a supplementary CD 314, as opposed to a regular CD 310, although there is a possibility that the next available descriptor could be a regular CD 310. The MSS 112 may then take an appropriate action at that point, such as staying awake for receipt of the supplementary CD 314 (or regular CD 310) or even going back to a sleep mode and waking up at the arrival time of the supplementary CD 314 (or regular CD 310).

Once it receives the supplementary CD 314 (or regular CD 310), the MSS 112 can be made aware of any modulation changes, and the MSS 112 can take appropriate action. As such, the MSS 112 can quickly learn of modulation changes and take the necessary steps to limit the disruption of its operation in view of them. The supplementary CDs 314 can be transmitted periodically at any suitable rate, so long as they help reduce the amount of time that normally would have been needed for the MSS 112 to obtain the new modulation information. In addition, the supplementary CDs 314 can be transmitted for one or more CD intervals 312, and once completed, the BS 110 can resume transmission of channel descriptors at their regular intervals.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for improving transmission or receipt of channel descriptors, comprising:
   in a wireless communication system that periodically broadcasts regular channel descriptors at a set interval, changing a modulation and coding scheme; and
   in response to changing the modulation and coding scheme, transmitting one or more supplementary channel descriptors during the set interval between regular channel descriptors, wherein the one or more supplementary channel descriptors contain less information than what is contained in the regular channel descriptors.

2. The method according to claim 1, further comprising periodically transmitting a channel descriptor count that provides an indication of the changed modulation and coding scheme.

3. The method according to claim 2, wherein the channel descriptor count is in a downlink map or an uplink map.

4. The method according to claim 1, further comprising periodically transmitting a pointer that identifies the arrival of one or more of the supplementary channel descriptors.

5. The method according to claim 4, wherein the pointer is a broadcast control pointer as set forth in the 802.16e standard.

6. The method according to claim 1, wherein the information in the supplementary channel descriptors is information relating to the changed modulation and coding scheme.

7. The method according to claim 1, wherein the regular and supplementary channel descriptors are downlink channel descriptors or uplink channel descriptors.

8. The method according to claim 1, wherein the channel descriptor count is in a downlink map or an uplink map.

9. The method according to claim 1, further comprising using a pointer to determine the arrival of one or more of the supplementary channel descriptors.

10. A method for improving transmission or receipt of channel descriptors, comprising:
    in a mobile station that periodically receives regular channel descriptors transmitted at a set interval, detecting a change in a modulation and coding: scheme of a base station; and
    in response to detecting the change in the modulation and coding scheme of the base station, receiving one or more supplementary channel descriptors during the set interval between regular channel descriptors, wherein the one or more supplementary channel descriptors contain less information than what is contained in the regular channel descriptors.

11. The method according to claim 10, further comprising detecting the change in the modulation and coding scheme through a channel descriptor count.

12. The method according to claim 10, wherein the regular and supplementary channel descriptors are downlink channel descriptors or uplink channel descriptors.

13. A base station that improves the transmission of channel descriptors, comprising:
    a transmitter that periodically broadcasts regular channel descriptors at a set interval; and
    a processor communicatively coupled to the transmitter, wherein the processor is programmed to change a modulation and coding scheme and in response to changing the modulation and coding scheme, the transmitter transmits one or more supplementary channel descriptors during the set interval between regular channel descriptors, wherein the one or more supplementary channel descriptors contain less information than what is contained in the regular channel descriptors.

14. The base station according to claim 13, wherein the transmitter periodically transmits a channel descriptor count that provides an indication of the changed modulation and coding scheme.

15. The base station according to claim 13, wherein the transmitter periodically transmits a pointer that identifies the arrival of one or more of the supplementary channel descriptors.

16. A mobile station, comprising:
   a receiver that periodically receives from a base station regular channel descriptors transmitted at a set interval; and
   a processor, wherein the processor is communicatively coupled to the receiver, wherein the processor is programmed to detect a change in a modulation and coding scheme of a base station and in response to detecting the change in the modulation and coding scheme, the receiver receives one or more supplementary channel descriptors during the set interval between regular channel descriptors, wherein the one or more supplementary channel descriptors contain less information than what is contained in the regular channel descriptors.

17. The mobile station according to claim 16, wherein the processor is further programmed to detect the change in the modulation and coding scheme through a channel descriptor count.

18. The mobile station according to claim 16, wherein the processor is further programmed to use a pointer to determine the arrival of one or more of the supplementary channel descriptors.

* * * * *